May 23, 1944.  J. S. RHYNE  2,349,308

VOLTAGE REGULATOR

Filed July 20, 1943

INVENTOR.
JEFF S. RHYNE
BY
C. E. Herrstrom & H. E. Thibodeau
ATTORNEYS

Patented May 23, 1944

2,349,308

UNITED STATES PATENT OFFICE 2,349,308

VOLTAGE REGULATOR

Jeff Smith Rhyne, Detroit, Mich.

Application July 20, 1943, Serial No. 495,432

4 Claims. (Cl. 171—223)

(Granted under the act of March 3, 1883, as amended April 30, 1928; 370 O. G. 757)

The invention described herein may be manufactured and used by or for the Government for governmental purposes, without the payment to me of any royalty thereon.

The present invention pertains to a novel voltage regulator for the output of a generator. A typical application exists in the case of motor vehicles carrying equipment, such as radio apparatus, which requires substantial quantities of current. The equipment is operated, directly or through batteries, from a generator carried by the vehicle. The generator is driven from the motor of the vehicle or from an auxiliary engine. The regulation of the output voltage of the generator, in either case, is a well recognized problem.

The principal object of this invention is to provide a regulating system which maintains a fairly constant output voltage within the normal speed range of a generator driven in constant ratio to the engine speed. The invention is applicable to stationary as well as mobile installations. A more specific object is to obtain sensitive or delicate control through the use of relatively simple apparatus.

The invention makes use of a generator of the Amplidyne type. The control field of the Amplidyne is connected in a resonant circuit. This circuit is energized through a transformer, the primary winding of which is connected across either the short-circuited brushes or the output brushes, preferably the former. The transformer thus responds only to the alternating current component caused by the commutator ripple, the frequency of which is proportional to the speed of the generator. Within a predetermined frequency range, the control field holds the generator to substantially constant speed.

An illustrative embodiment of the invention is disclosed in the following description and in the accompanying drawing in which.

Figure 1:
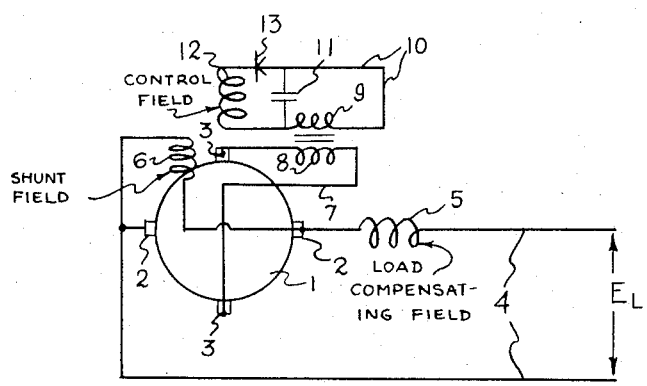
Figure 1 is a wiring diagram of the apparatus.

In Figure 1 is illustrated an Amplidyne unit consisting of a generator 1, a pair of output brushes 2, and a pair of short-circuited brushes 3 alternating with the brushes 2. The Amplidyne is well known in the art and is described in the September, 1940 issue of Iron and Steel Engineer. The load circuit 4 is connected across the brushes 2 and contains a load compensating field 5. Also connected across the output brushes 2 is a shunt field winding 6. The short circuit across the brushes 3 is designated by the numeral 7.

In circuit with one of pairs of brushes, preferably the short-circuited brushes, is the primary winding 8 of a transformer. The secondary winding 9 is comprised in a resonant circuit 10 containing a suitable condenser 11. In the resonant circuit, and preferably in parallel relation, is a control field coil 12 corresponding to the control field of the usual Amplidyne system. The control field 12 is mounted opposite the shunt field 6 and receives rectified current from the resonant circuit through a suitable rectifier 13.

The current induced in the resonant circuit and delivered to the control field is initiated by the commutator ripple or the alternating component of the current flowing in the primary winding 8. The frequency of the ripples is proportional to the speed of the generator. The current and flux in the control field 12 are determined by the frequency and the secondary voltage which depends on the short-circuit current and in turn on the speed of the generator. The control field therefore exercises within limits a regulating effect on the generator speed through the shunt field 6.

Figure 2:
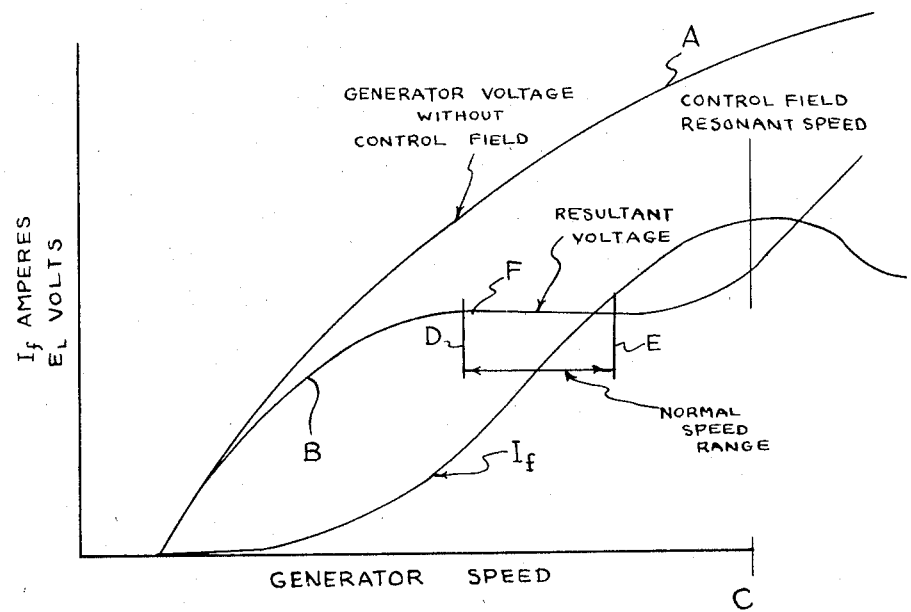
Figure 2 is a graph illustrating the behavior of the apparatus.

The regulatory effect is illustrated in Figure 2 in which the curve A represents the normal increase of current and voltage with generator speed. The controlled or resultant voltage, modified according to the invention, is represented by the curve B. The resonant circuit is preferably designed to have its resonant point at C, slightly above the maximum rated speed of machine, the frequency being the generator speed times the number of commutator bars. The normal speed range of the generator lies between the values D and E. The components of the resonant circuit are chosen to produce the desired current-frequency characteristic for imparting to the curve B a substantially constant voltage ordinate F between the generator speed values D and E. This is illustrated in Figure 2. The voltage in the resonant circuit is approximately proportional to the current $I_r$ and may be represented by the curve $I_r$. The resultant voltage is the difference between the uncontrolled generator voltage and the resonant circuit voltage and is constant where the curves A and $I_r$ are approximately parallel. The characteristics of curves A and $I_r$ are so chosen as to have approximately parallel portions in the normal speed range D—E of the generator.

The system is more readily applicable to an auxiliary generator driven from an auxiliary engine having a governor confining the speed range within relatively small limits, having a difference on the order of 100 to 150 R. P. M. Nevertheless, with proper refinements, the system may be applied in the case of a motor vehicle, to a generator driven by the propelling engine, the speed range of which is dependent on the engine speed and varies with the type of vehicle.

Within the scope of the invention, the primary of the transformer may be either in the load circuit or in the short circuit, and the secondary may be either in series or in parallel with the control field. The parallel connection has a wider utility inasmuch as it is applicable to a larger number of combinations of capacity and inductance values in the resonant circuit.

Although a specific embodiment of the invention has been illustrated and described, it will be understood that various alterations in the details of construction may be made without departing from the scope of the invention as indicated by the appended claims.

What I claim is:

1. Means for regulating the output voltage of a generator comprising, in combination with a generator having a pair of output brushes and a pair of short-circuited brushes in alternating relation, a transformer having its primary in the circuit of one of said pairs of brushes, a resonant circuit containing the secondary of said transformer, a control field winding in said resonant circuit, a rectifier in series with said control field winding, and a shunt field winding connected to said output brushes and located in opposition to the field of said control winding.

2. Means for regulating the output voltage of a generator comprising, in combination with a generator having a pair of output brushes and a pair of short-circuited brushes in alternating relation, a transformer having its primary in the circuit of said short-circuited brushes, a resonant circuit containing the secondary of said transformer, a control field winding in said resonant circuit, a rectifier in series with said control field winding, and a shunt field winding connected to said output brushes and located in opposition to the field of said control winding.

3. Means for regulating the output voltage of a generator comprising, in combination with a generator having a pair of output brushes and a pair of short-circuited brushes in alternating relation, a transformer having its primary in the circuit of one of said pairs of brushes, a resonant circuit containing the secondary of said transformer, a control field winding connected in parallel with said resonant circuit, a rectifier in series with said control field winding, and a shunt field winding connected to said output brushes and located in opposition to the field of said control winding.

4. Means for regulating the output voltage of a generator comprising, in combination with a generator having a pair of output brushes and a pair of short-circuited brushes in alternating relation, a transformer having its primary in the circuit of said short-circuited brushes, a resonant circuit containing the secondary of said transformer, a control field winding connected in parallel with said resonant circuit, a rectifier in series with said control field winding, and a shunt field winding connected to said output brushes and located in opposition to the field of said control winding.

JEFF SMITH RHYNE.